(12) United States Patent
Dickens (10) Patent No.: US 7,082,191 B1
(45) Date of Patent: Jul. 25, 2006

(54) TELEPHONE USAGE CONTROL

(75) Inventor: James Edward Dickens, Ocoee, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 690 days.

(21) Appl. No.: 10/068,607

(22) Filed: Feb. 6, 2002

(51) Int. Cl.
*H04M 1/66* (2006.01)
*H04M 15/00* (2006.01)
*H04M 3/42* (2006.01)

(52) U.S. Cl. .................. 379/200; 379/128; 379/131; 379/210.02

(58) Field of Classification Search ............... 379/118, 379/120, 128, 131, 188, 199, 200, 210.02
See application file for complete search history.

(56) References Cited

U.S. PATENT DOCUMENTS

| | | | | | |
|---|---|---|---|---|---|
| 4,251,692 | A | * | 2/1981 | Waldman | 379/131 |
| 4,953,202 | A | * | 8/1990 | Newell | 379/200 |
| 5,062,134 | A | * | 10/1991 | Laird | 379/131 |
| 5,109,408 | A | * | 4/1992 | Greenspan et al. | 379/107 |
| 5,448,630 | A | * | 9/1995 | Barstow | 379/199 |
| 5,467,388 | A | * | 11/1995 | Redd et al. | 379/210.02 |
| 5,471,524 | A | * | 11/1995 | Colvin et al. | 379/200 |
| 5,655,013 | A | * | 8/1997 | Gainsboro | 379/188 |
| 5,802,157 | A | * | 9/1998 | Clarke et al. | 379/196 |
| 5,809,126 | A | * | 9/1998 | Smith et al. | 379/200 |
| 5,864,613 | A | * | 1/1999 | Flood | 379/188 |
| 6,134,310 | A | * | 10/2000 | Swan et al. | 379/188 |
| 6,246,756 | B1 | * | 6/2001 | Borland et al. | 379/142.01 |
| 6,385,310 | B1 | * | 5/2002 | Holiday, II | 379/120 |

* cited by examiner

*Primary Examiner*—Bing Q. Bui
(74) *Attorney, Agent, or Firm*—Merchant & Gould (57) ABSTRACT

A device and method for controlling the use of a telephone make a determination as to whether a telephone call may proceed. The determination may be based upon a time reference, such as a total amount of time that a call may proceed or an interval of time when a call is not permitted. The determination may alternatively be based upon whether the user is authorized by entry of a personal identification number prior to placing the phone call. Various other considerations may be accounted for including whether the call is to a particular telephone number and/or whether the call is long distance. If the call may not proceed, then the circuit between a telephone and the telephone network is obstructed to terminate the telephone call.

23 Claims, 7 Drawing Sheets

TELEPHONE USAGE CONTROL

TECHNICAL FIELD

The present invention relates to controlling the use of a telephone. More specifically, the present invention relates to governing the use of a telephone based on criteria such as but not limited to who is being called, when the call is being placed, the maximum length of the call, and/or who is placing the call.

BACKGROUND

Telephone service is an important resource for most people because it enables them to easily communicate with others over great distances. Telephone service has progressed to where a user may place a virtually unlimited number of calls per day and any one call may have a virtually unlimited duration. The constraints for placing telephone calls, such as when a call may be placed and how long a call may proceed, arise due to choices made by the telephone user rather than any constraint being inherent in the telephone service. Although placing telephone calls is an important part of daily life, it may be desirable on occasion to control the usage of a telephone.

Several examples demonstrate how controlling telephone usage may occasionally be desirable. For instance, long distance calls increase in cost as the length of the call increases, and some individuals may inadvertently spend an excessive amount of time, and therefore money, on a particular long distance call. Furthermore, within a given household, rules may be imposed on telephone use such as the particular time of day when a call can be placed to a friend, and/or the amount of time the call to the friend may last. Enforcing such rules and preventing excessive or unauthorized use is difficult because close monitoring of the telephone must be done.

Therefore, there is a need for an improved way to place constraints on the use of telephone service.

SUMMARY

Embodiments of the present invention provide methods and devices for controlling telephone usage. The methods and devices permit constraints to be placed upon use of a telephone or telephone service by one or more ways. The methods and devices employ breaking a circuit between a telephone and a telephone line to control whether a telephone call may proceed. The device employs a switch for breaking the circuit where the switch is controlled by logic that detects whether it is appropriate for the phone call to proceed.

The control of telephone usage may be based on a comparison of a determined time to a time reference. The time reference may be of several forms, such as a maximum amount of time that a call may proceed. Thus, if a call may proceed for only a set amount of time, then the set amount of time that is the time reference is compared to the determined time to detect whether the set amount of time has expired. If so, then the circuit is broken to automatically end the call. The time reference may be an interval of time when a call may not proceed, such as during a particular part of the day, and this time reference is compared to the determined time to see if the determined time falls within the interval. If the time is within the interval, then the circuit is broken so that the call may not be completed.

Additional considerations may be made when deciding to allow the phone call to proceed in addition to the time reference. For example, the control may be applied only to certain telephone numbers or only to long distance calls. Furthermore, a specific time reference may be applied to a specific telephone number. Additionally, other considerations may be provided, such as allowing calls to 911 to proceed without regard to the time reference and allowing the duration of the call to be extended once the end of the allowable time has arrived.

The control of the telephone usage may also be based on knowledge of a personal identification number (PIN). The phone call may proceed only if the PIN is entered prior to dialing the number. Other considerations may be made in this embodiment as well, such as allowing calls to 911 without a PIN or restricting only long distance calls with a PIN. Additionally, the PIN may be required for only a set of telephone numbers to be called or for all telephone number besides those in the set.

The various aspects of the present invention may be more clearly understood and appreciated from a review of the following detailed description of the disclosed embodiments and by reference to the drawings and claims.

DETAILED DESCRIPTION

Figure 1:
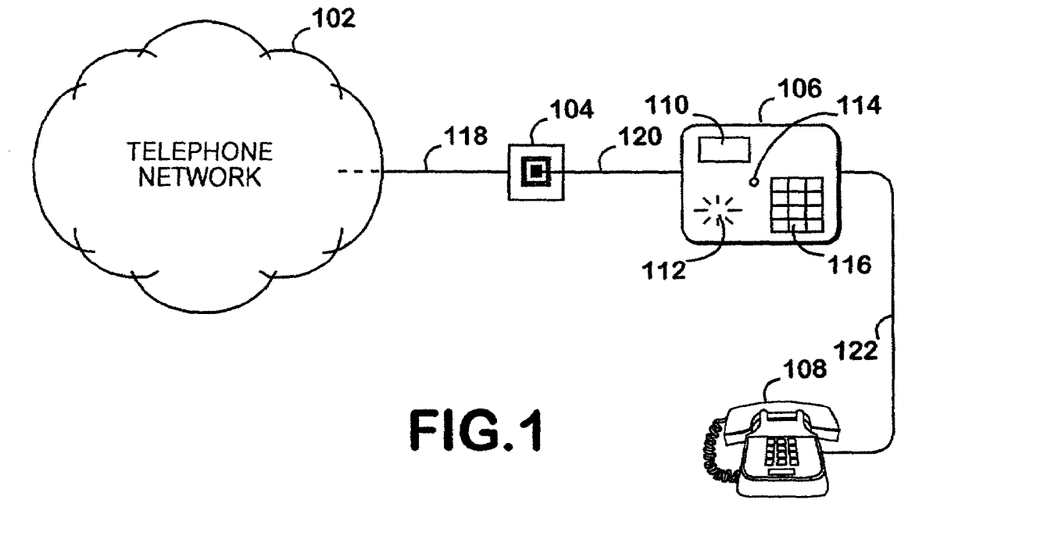
FIG. 1 is a diagram depicting one embodiment whereby a device for controlling telephone usage is placed between the telephone line and the telephone.

FIG. 1 shows a simplified view of a telephone service environment where various embodiments of the present invention may be implemented. A standard telephone network 102 provides a subscriber line 118 that leads to a phone jack 104. Telephone service is provided through the phone jack 104 by connection to a telephone cable 120. Telephone line 120 leads to a control device 106. A telephone 108 connects to the telephone line 120 through control device 106 via telephone cable 122.

Although shown as a separate device 106, control device 106 could be integrated into a telephone 108 whereby interconnection to the components of device 106 to the components of the telephone 108 are internal rather than through external line 122. The control device 106 controls telephone usage by completing or obstructing the circuit between telephone line 120 and telephone line 122, depending upon whether a call may proceed. As discussed below, the control device 106 employs digital logic to determine whether the call should proceed and to complete or obstruct the telephone circuit.

The control device 106 has several external features that enhance the ability to control telephone usage. The use of the external features will be discussed below in relation to the operations that occur when using the device 106. Such external features include a display screen 110, such as a liquid crystal display (LCD) that provides textual information to the telephone user. A light 114 such as a light emitting diode (LED) may be included to provide an additional visual indicator. A speaker 112 may be included to provide an audible indicator. A keypad 116 may be included to receive input from a user, such as criteria employed by the digital logic including specific telephone numbers to monitor or an access PIN.

Figure 2:
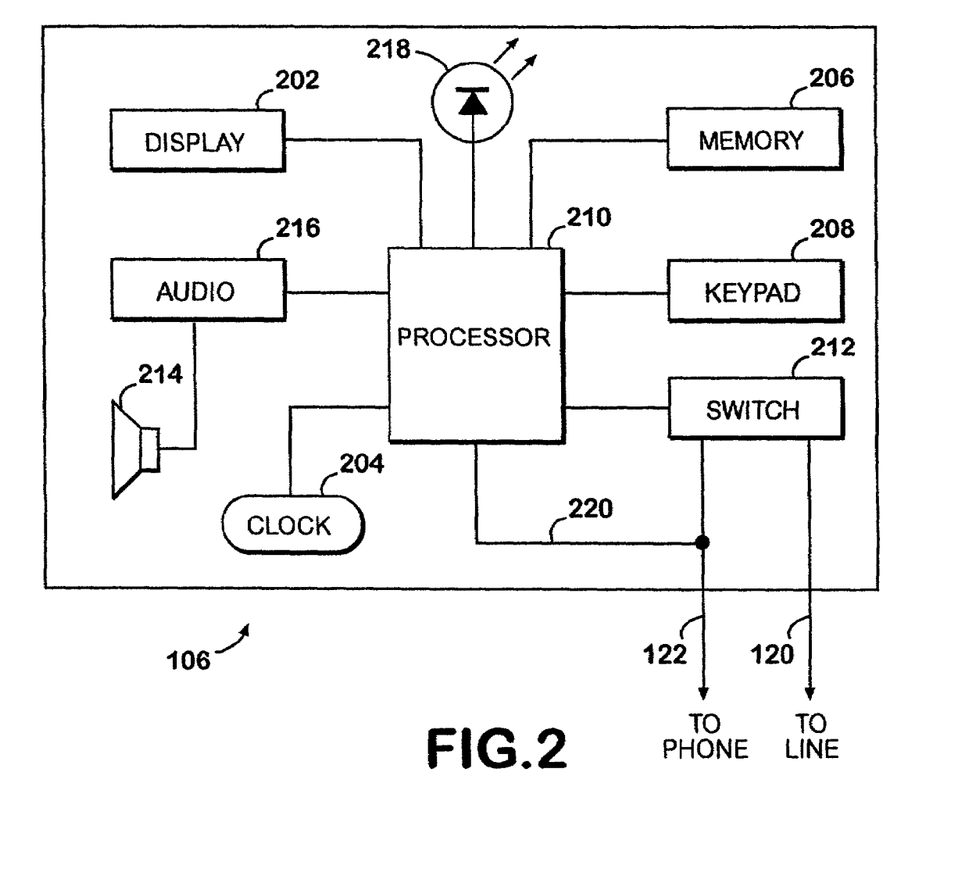
FIG. 2 is a block diagram showing the general components of a device for controlling telephone usage.

FIG. 2 shows the general components of the device 106 in block diagram form. The control device 106 includes a processor 210, such as hardwired digital logic or a general-purpose programmable processor. The processor 210 performs logical operations to make determinations as to whether a particular call should proceed. Examples of the logical operations that may be performed are discussed below with reference to FIGS. 3–8. The processor 210 is operatively coupled to additional components to facilitate these logical operations.

The processor 210 is coupled to a switch 212 that has at least two positions, open and closed, that are selected by the processor 210. The switch 212 has one terminal connected to the phone line 120 and another terminal connected to the phone line 122 such that the operation of the switch 212 from one position to the other serves to make or break electrical continuity between phone line 120 and phone line 122. The processor 210 may also be connected to the phone line 122 or phone line 120 through a coupling 220 and is configured to monitor the actual phone line signal to detect dialed tones or pulses.

In certain embodiments, the processor 210 may rely upon information from a reference clock 204 and/or digital memory 206. The reference clock 204 may be a digital clock that maintains the time of day. In embodiments where the actual time of day is not relevant but elapsed time is relevant, reference clock 204 may be a timer circuit. Digital memory 206 may be RAM, ROM, and any combination, and it stores volatile and non-volatile data accordingly. The processor's interaction with the memory 206 and clock 204 is discussed below with reference to the logical operations.

The processor 210 may also be configured to control the external features of the control device 106. A keypad circuit 208 for keypad 116 may be linked to the processor 210 to allow the user to input data. An audio circuit 216 driving a speaker 214 may be linked to the processor 210 to allow the speaker to provide an audible indication to the user. A display circuit 202 for the LCD display 110 may be linked to the processor 210 to provide the textual information. Also, an LED 218 may be linked to the processor 210 to provide an additional visual indicator.

Figure 3:
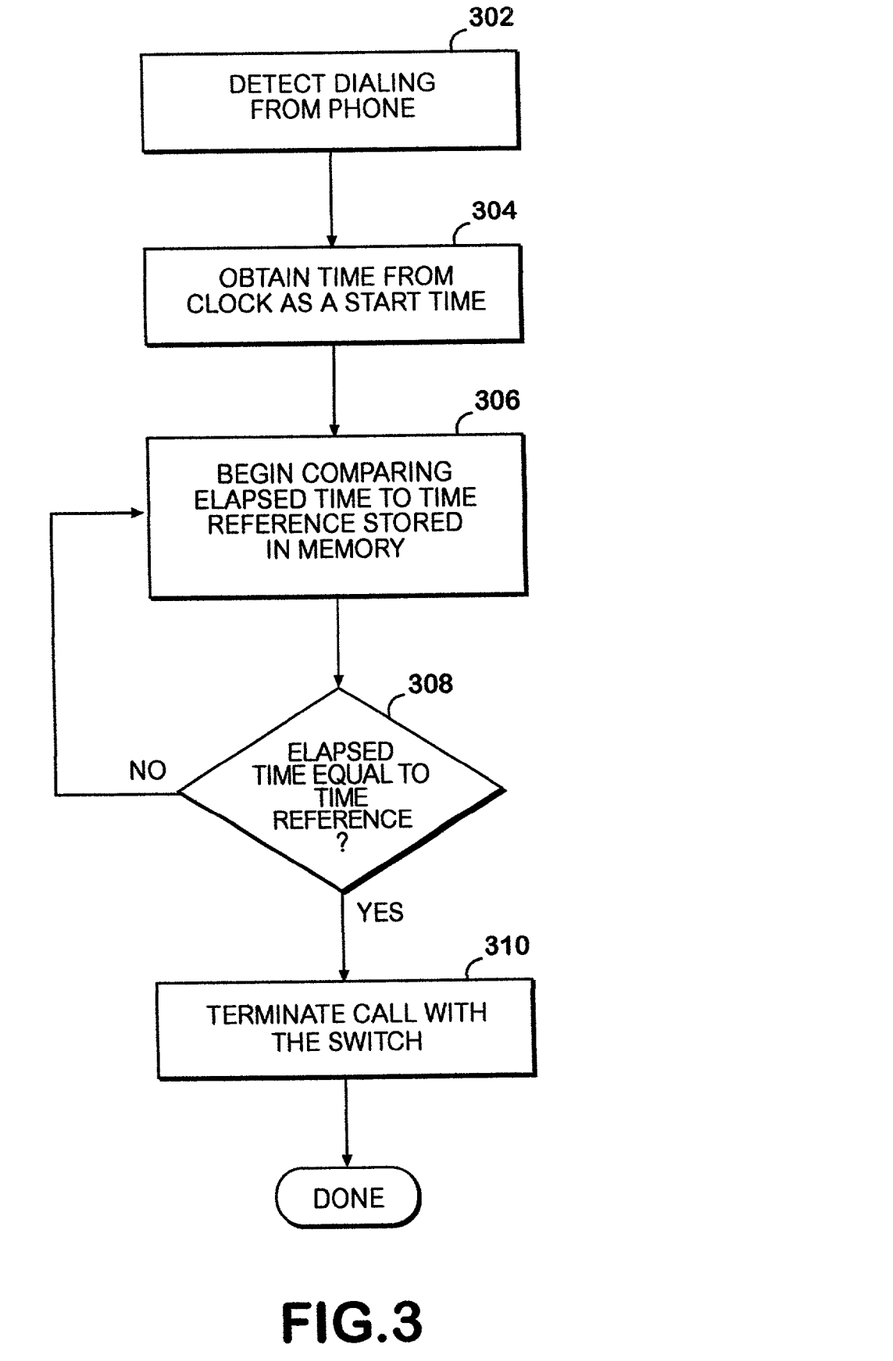
FIG. 3 is an operational flow of an embodiment where a phone call is controlled according to a time reference that is a maximum amount of time for a call to proceed.

FIG. 3 shows exemplary logical operations of the processor 210 where the time reference used to control the call is a maximum amount of time that the call may last. In this embodiment, the control device 106 considers only the time reference when controlling use of the telephone 108. The logical operations begin at detect operation 302 where processor 210 through its coupling 220 detects that a number is being dialed from the telephone 108. Once dialing is detected, the processor 210 obtains the time from the clock 204 to use as a start time for the call in progress at time operation 304. As an alternative to using a clock 204 that keeps the time of day, a timer may be used and the processor 210 would start the timer at time operation 304.

Once the start time has been established, or the timer is running, the processor 210 begins comparing the elapsed time from the clock 204 during the call in progress to the time reference stored in memory 206 at compare operation 306. The time reference, which is the maximum amount of time that the call may proceed, may be a default setting in memory 206 or a setting entered by a user through the keypad 116 either during setup of the device 106 or prior to each call. Once the elapsed time is compared to the time reference, the processor 210 at query operation 308 detects whether the elapsed time is equal to the time reference.

If the time reference is not equal to the elapsed time, then the call has not reached the maximum time allowed. When this is the case, operational flow transitions back to compare operation 306 where the processor 210 again performs a comparison of the time reference to the elapsed time. Once query operation 308 detects that the elapsed time does equal the time reference, then the processor 210 triggers the switch 212 to move from its first position to a second position at switch operation 310. The operation of the switch 212 breaks the circuit between the telephone 108 and the telephone line 120 to terminate the call.

The switch 212 may break the circuit by opening the connection to terminate the call at the phone 108 connected through the device 106. The switch 212 may alternatively be configured to electrically short the circuit from the phone line 120 so that all phones on the same subscriber line 118 are not able to maintain the phone call. In either case, the device 106 has controlled the amount of time a user can spend on the telephone 108.

Figure 4:
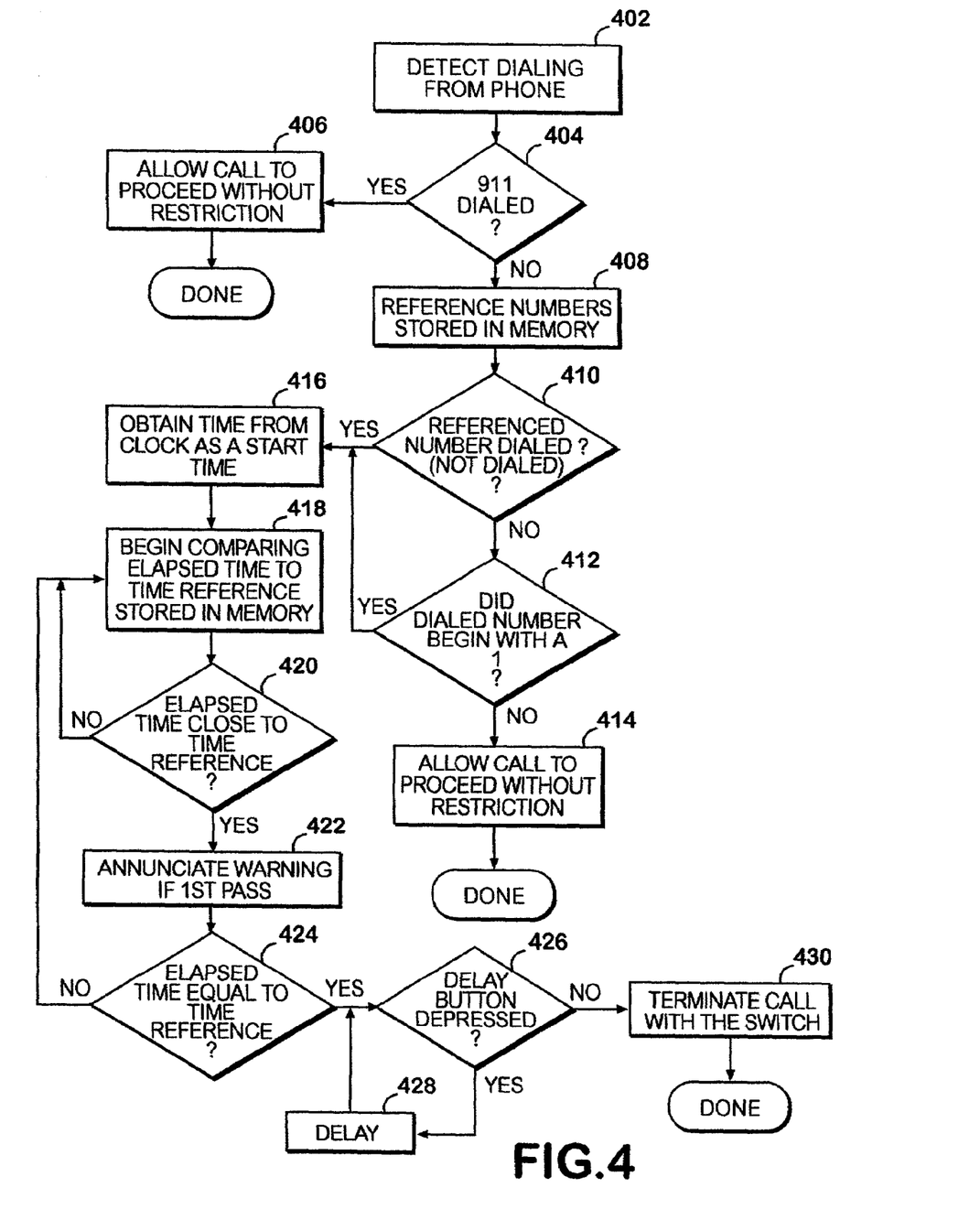
FIG. 4. is an operational flow of an embodiment where a phone call is controlled according to a time reference that is a maximum amount of time for a call to proceed in conjunction with other considerations.

FIG. 4 shows exemplary logical operations of the processor 210 where other considerations are accounted for in addition to the time reference when determining whether to terminate a phone call. The logical operations begin at detect operation 402 where the processor 210 through its coupling 220 detects that a number is being dialed from the telephone 108 and records the dialed number. Recording the dialed number involves recognizing from the tones or pulses transmitted from the phone 108 the numbers being dialed as is conventionally done by the telephone network 102.

After the dialed number has been detected and recorded, the processor 210 at query operation 404 detects whether the dialed number is 911. If so, then the processor 210 leaves the switch 212 in position to complete the telephone circuit to allow the call to proceed unrestricted at call operation 406. If query operation 404 detects that the dialed number is not 911, then operational flow transitions to number operation 408. Here, the processor 210 references telephone numbers stored in memory 206 to compare the recorded telephone number that has been dialed to those in memory 206. The numbers in memory 206 may be stored at setup of the device 106 by the user entering them through the keypad 116.

The user may place telephone numbers in memory 206 to place restrictions on calls to the numbers or to place limits on all calls not to the numbers. For example, a parent may want to restrict the amount of time a child spends on the phone when calling a friend, so the telephone number of the friend is stored in memory 206 as a number to restrict. Alternatively, parents may want to restrict the amount of time a child spends on the phone when calling anyone but grandparents, so the number of the grandparents is stored in memory 206 as a number to not restrict.

After referencing the dialed numbers in memory 206, the processor 210 detects whether the dialed number matches a number in memory 206 at query operation 410. In the case where stored numbers indicate those to restrict and where a match is found, operational flow transitions to time operation 416. If no match is found in this case, then operational flow transitions to query operation 412. In the alternative case (indicated by parenthetical in query operation 410) where stored numbers indicate those not to restrict and where a match is not found, operational flow transitions to time operation 416. If a match is found in this case, then operational flow transitions to query operation 412.

Once operational flow transitions to query operation 412, the processor 210 detects whether the dialed number begins with a 1. If so, then the call is long distance and operational flow transitions to time operation 416. If not, then the call may not be long distance, and the processor 210 maintains the switch 212 in the first position to complete the telephone circuit and allow the call to proceed without restriction at call operation 414.

Once operational flow transitions to time operation 416, the processor 210 obtains the time from the reference clock 204 as a start time, or starts the timer 204. The processor 210 then begins to compare the elapsed time to the time reference in memory 206 that indicates the maximum amount of time that the call may proceed at compare operation 418. At query operation 420, the processor 210 detects whether the elapsed time is close to the time reference based on a default or user defined amount of time, such as five minutes. If not, then operational flow transitions back to compare operation 418.

If the elapsed time is close to the time reference, the operational flow transitions to warning operation 422. Here, if on the first pass to this operation 422 for the current call, the processor 210 triggers the audio circuit 216, the LED 218, and/or the display circuit 202 to annunciate or otherwise alert the user that the time for the phone call is about to expire. Query operation 424 then detects whether the elapsed time is equal to the time reference. If not, then operational flow returns to compare operation 418. If the elapsed time is equal to the time reference, then operational flow transitions to query operation 426.

The processor 210 detects whether a delay button of the control device 106 has been depressed at query operation 426. For example, a specific key on the keypad 116 may act as a delay button so that the user may override the termination of the call by depressing the delay button after hearing the warning but before the duration of the call exceeds the time reference. If the delay button has been depressed, then the processor 210 delays terminating the call for a default or user defined amount of time at delay operation 428. After the delay, query operation 426 again detects whether the delay button has been depressed during the delay period.

Once query operation 426 detects that the delay button has not been depressed, then switch operation 430 causes the switch 212 to terminate the call. As shown in this embodiment, several additional considerations have been accounted for in addition to the time reference prior to terminating the call, including detecting 911 calls, detecting reference phone numbers in memory for comparison, detecting a long distance call, providing a warning, and permitting a delay. One skilled in the art will appreciate that the operational flow may be altered to eliminate one or more of the particular considerations.

For example, one embodiment may involve only detecting 911 calls and detecting long distance calls in addition to monitoring the time reference while another embodiment involves only detecting the reference phone numbers in memory while providing a warning prior to terminating the call. Additional permutations are possible as well, such as where the clock 204 maintains the time of day and the processor 210 immediately terminates the call when a number in memory 206 is dialed again after a call to the same number has already occurred on the same day.

Figure 5:
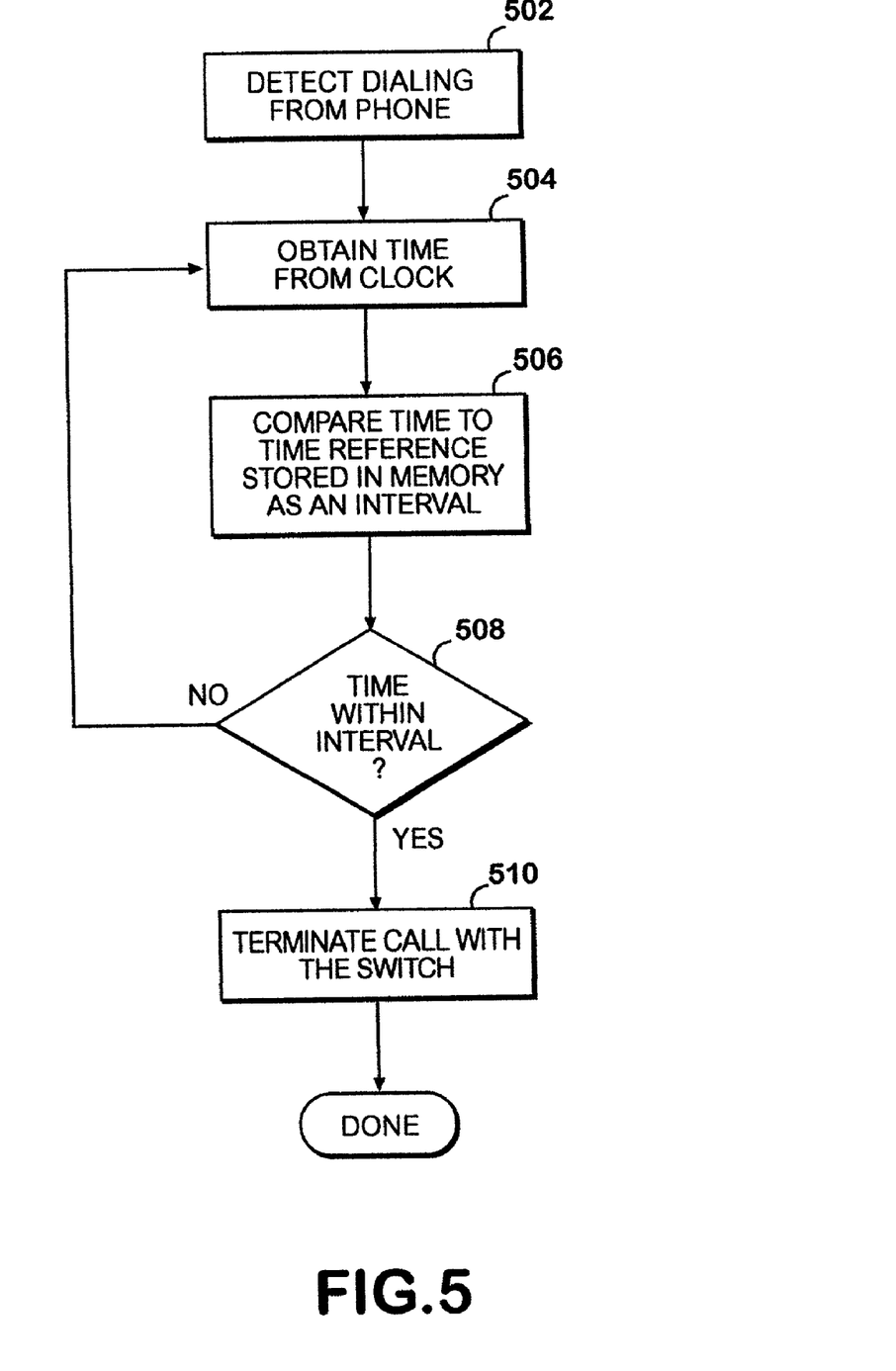
FIG. 5 is an operational flow of an embodiment where a phone call is controlled according to a time reference that is an interval when a call cannot proceed.

An additional embodiment is shown in FIG. 5 where the time reference is an interval of time during the day and the only consideration is whether the time when the phone call is occurring is within the interval. The logical operations begin at detect operation 502 where the processor 210 through its coupling 220 detects that numbers are being dialed from the telephone 108. The processor 210 then obtains the current time of day from the clock 204 at time operation 504. Once the time is known, the processor 210 compares the current time to the time reference stored in memory 206.

The processor 210 decides whether the call should be terminated based on the comparison of the time reference to the current time at compare operation 506. At query operation 508, it is detected whether the current time is within the interval. If not, then operational flow returns to time operation 504 where the processor 210 again obtains the current time. If the current time does fall within the interval specified by the time reference, then switch operation 510 terminates the call with the switch 212.

Figure 6:
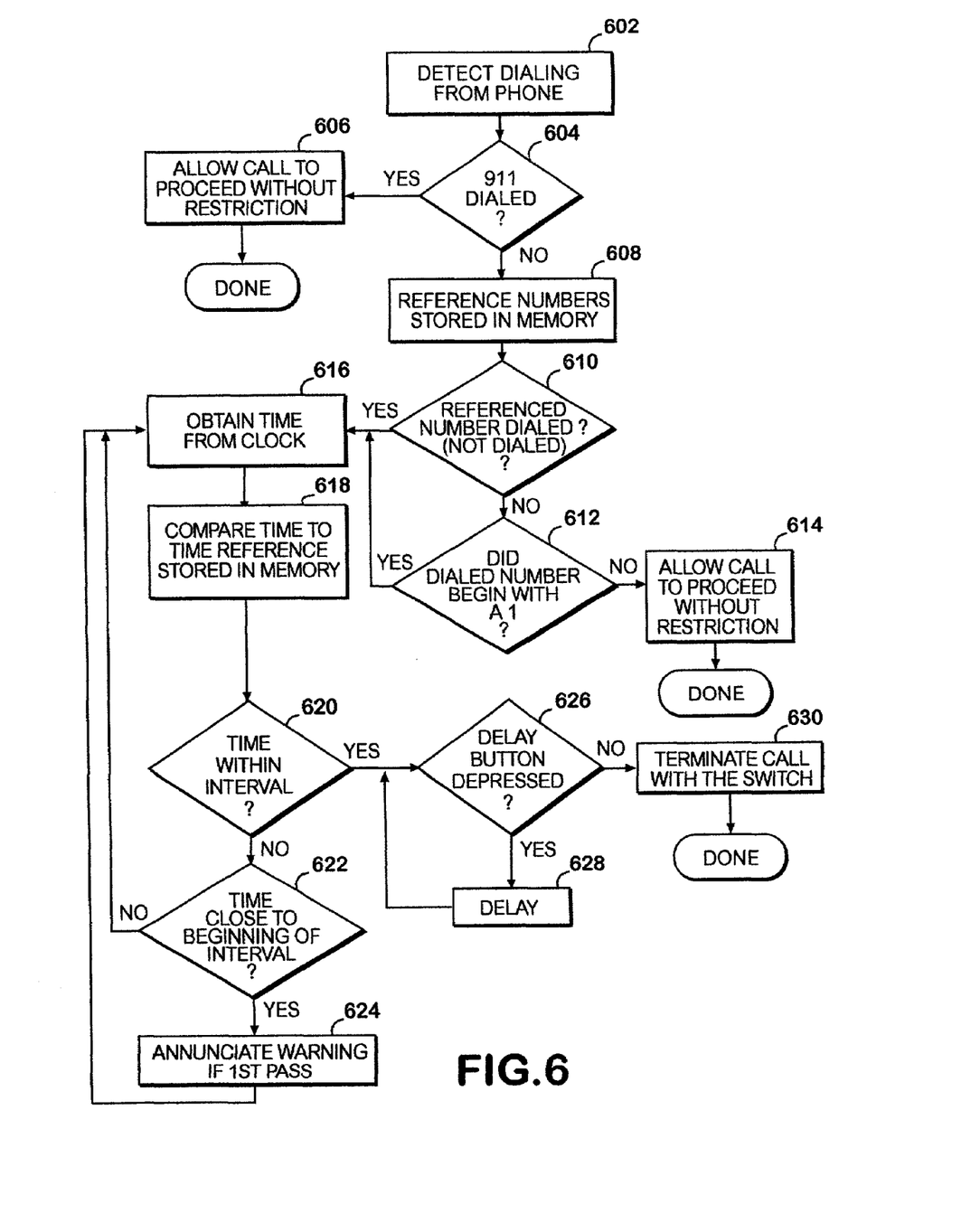
FIG. 6 is an operational flow of an embodiment where a phone call is controlled according to a time reference that is an interval when a call cannot proceed in conjunction with other considerations.

As shown in FIG. 6, embodiments may include consideration of several factors in addition to determining whether the time of day when the call is occurring falls within the specified time interval. The logical operations begin at detect operation 602 where the processor 210 detects and records through coupling 220 a phone number being dialed from the telephone 108. At query operation 604, the processor 210 detects whether 911 has been dialed. If so, then the call proceeds unrestricted at call operation 606. If not, then operational flow transitions to number operation 608.

The processor 210 references telephone numbers stored in memory 206 at number operation 608 to compare the dialed telephone number that has been detected to those stored in memory 206. As with the embodiment discussed with reference to FIG. 4, numbers may be stored in memory because calls to those numbers should be restricted, or alternatively because all calls but those to numbers stored in memory should be restricted. Query operation 610 detects whether one of the numbers in memory 206 has been dialed.

In the case where stored numbers indicate those to restrict and where a match is found, operational flow transitions to time operation 616. If no match is found in this case, then operational flow transitions to query operation 612. In the alternative case (indicated by parenthetical in query operation 610) where stored numbers indicate those not to restrict and where a match is not found, operational flow transitions to time operation 616. If a match is found in this case, then operational flow transitions to query operation 612.

Once operational flow transitions to query operation 612, the processor 210 detects whether the dialed number begins with a 1. If so, then the call is long distance and operational flow transitions to time operation 616. If not, then the call may not be long distance, and the processor 210 maintains the switch 212 in the first position to complete the telephone circuit and allow the call to proceed without restriction at call operation 614.

Once operational flow transitions to time operation 616, the processor 210 obtains the time of day from the reference clock 204. The processor 210 then compares the time of day to the time reference in memory 206 that indicates the interval during the day when the call may not proceed at compare operation 618. At query operation 620, the processor 210 detects whether the time of day is equal to the time reference. If not, then operational flow transitions to query operation 622. If so, then the processor 210 detects whether a delay button of the control device 106 has been depressed at query operation 626.

If the delay button has been depressed, then the processor 210 delays terminating the call for a default or user defined amount of time at delay operation 628. After the delay, query operation 626 again detects whether the delay button has been depressed during the delay period. Once query operation 626 detects that the delay button has not been depressed, then switch operation 630 causes the switch 212 to terminate the call.

When operational flow transitions to query operation 622, it is detected whether the time of day is close to the time reference. If the time of day is close to the time reference, then operational flow transitions to warning operation 624. Here, if on the first pass to this operation 624 for the current call, the processor 210 triggers the audio circuit 216, the LED 218, and/or the display circuit 202 to annunciate or otherwise alert the user that the allowable time period for the phone call is about to end. Operational flow then returns to time operation 616.

Similar to the embodiment of FIG. 4, several additional considerations have been accounted for in addition to the time reference prior to terminating the call, including detecting 911 calls, detecting reference phone numbers in memory for comparison, detecting a long distance call, providing a warning, and permitting a delay. One skilled in the art will also appreciate that this operational flow may be altered to eliminate one or more of the particular considerations.

Figure 7:
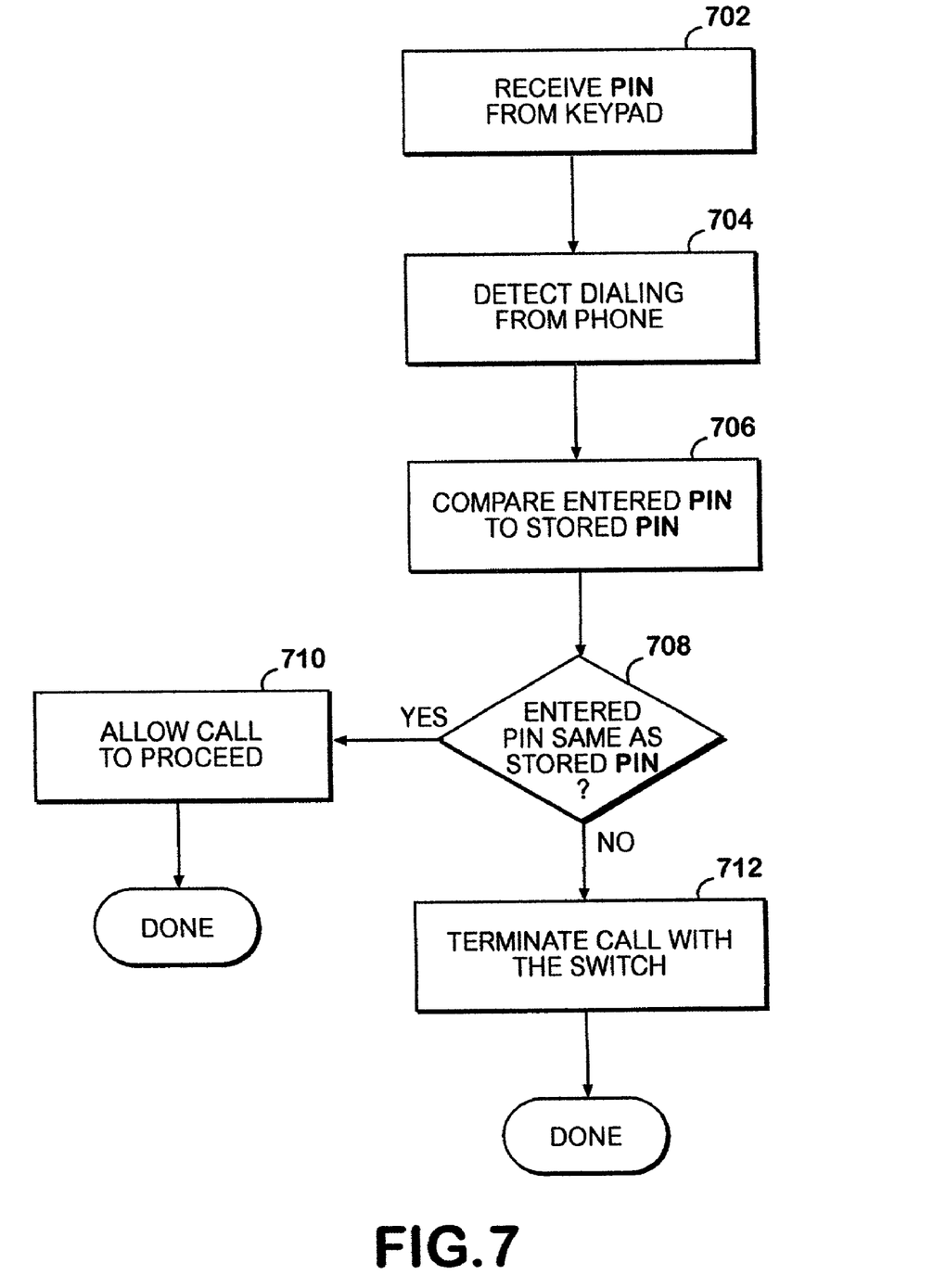
FIG. 7 is an operational flow of an embodiment where a phone call is controlled based upon entry of a PIN.

FIG. 7 shows an embodiment where the control device 106 prevents unauthorized users from placing phone calls. The logical operations begin at PIN operation 702 where the processor 210 receives entry of a PIN by a user through the keypad 116. At detect operation 704, the processor 210 through coupling 220 detects that a number is being dialed from the telephone 108. The processor 210 then compares the entered PIN to a default or user specified PIN stored in memory 206 to determine whether the user who entered the PIN is authorized at compare operation 706.

Query operation 708 then detects whether the entered PIN matches the stored PIN to determine whether the call may proceed. If the PIN numbers match, then the call proceeds without restriction at call operation 710. If the PIN numbers do not match, then the call is terminated through operation of switch 212 at switch operation 712.

Figure 8:
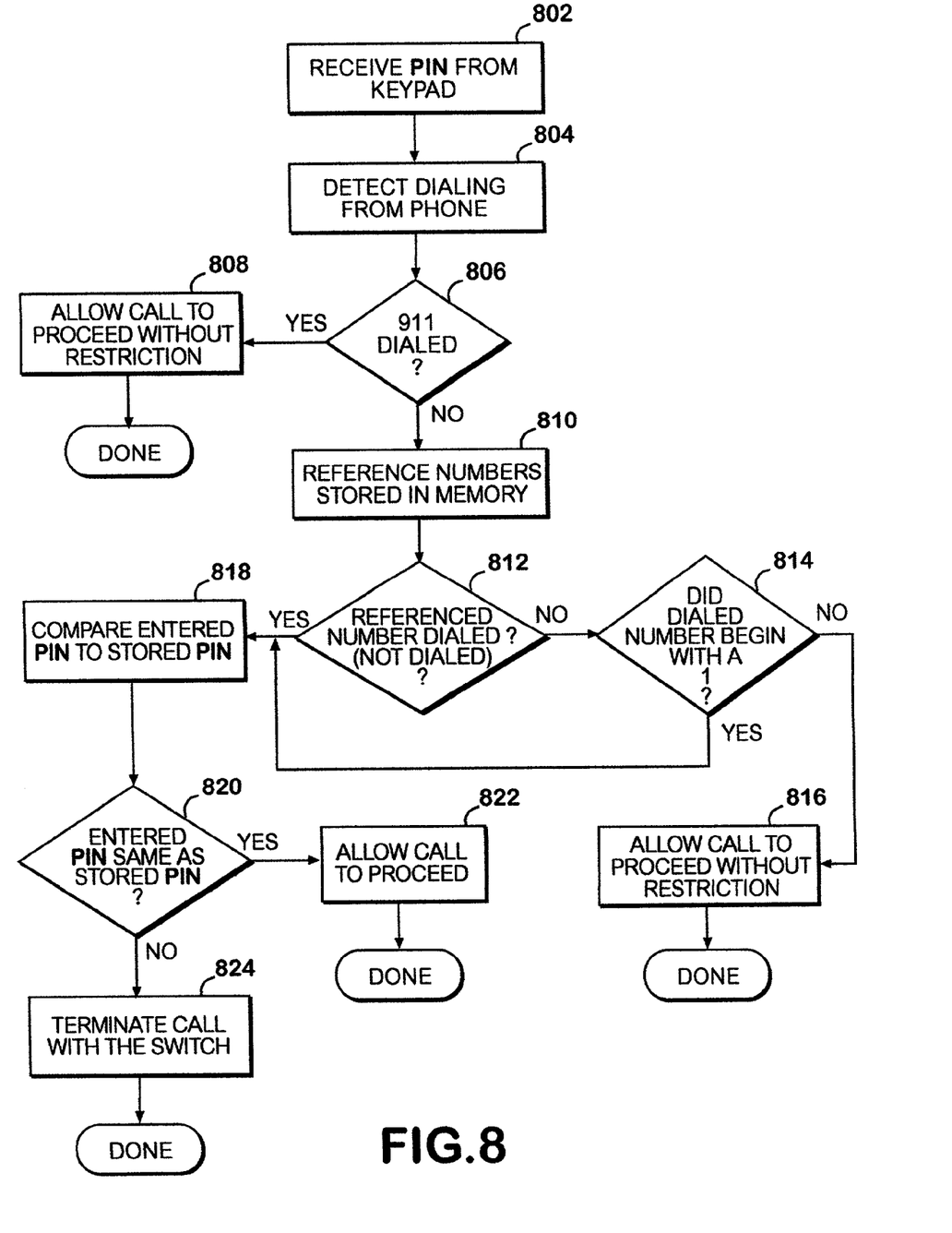
FIG. 8 is an operational flow of an embodiment where a phone call is controlled based upon entry of a PIN in conjunction with other considerations.

FIG. 8 shows an embodiment where considerations are accounted for in addition to whether a correct PIN has been entered by the user. The logical operations begin at PIN operation 802 where the processor 210 receives entry of a PIN by a user through the keypad 116. At detect operation 804, the processor 210 through coupling 220 detects and records a number being dialed from the telephone 108. Query operation 806 detects whether 911 has been dialed. If so, then the call proceeds without restriction at call operation 808. If not, then operational flow transitions to number operation 810.

At number operation 810, the processor 210 references numbers stored in memory 206 to compare the stored numbers to the dialed number. As previously discussed, telephone numbers may be stored in memory when calls to those numbers are to be restricted, or alternatively when calls to all numbers but those stored are to be restricted. Query operation 812 detects whether the dialed number matches a number stored in memory 206.

In the case where stored numbers indicate those to restrict and where a match is found, operational flow transitions to compare operation 818. If no match is found in this case, then operational flow transitions to query operation 814. In the alternative case (indicated by parenthetical in query operation 812) where stored numbers indicate those not to restrict and where a match is not found, operational flow transitions to compare operation 818. If a match is found in this case, then operational flow transitions to query operation 814.

Once operational flow transitions to query operation 814, the processor 210 detects whether the dialed number begins with a 1. If so, then the call is long distance and operational flow transitions to compare operation 818. If not, then the call may not be long distance, and the processor 210 maintains the switch 212 in the first position to complete the telephone circuit and allow the call to proceed without restriction at call operation 816.

Once operational flow transitions to compare operation 818, the processor 210 compares the entered PIN to a PIN stored in memory 206. Query operation 820 detects whether the entered PIN is the same as the stored PIN to determine whether the user is authorized to place a call. If the PINs match, then the call proceeds without restriction at call operation 822. If the PINs do not match, then the call is terminated through operation of the switch 212 at switch operation 824.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A device for controlling telephone usage, comprising:
    a switch coupled between a telephone line and a telephone wherein the switch completes a circuit between the telephone line and the telephone to allow a phone call to proceed when in a first position and obstructs a circuit between the telephone line and telephone to prevent a phone call from proceeding when in a second position;
    a reference clock;
    a processor operatively coupled to the reference clock and the switch, the processor being configured to control the position of the switch based on a comparison of a time reference to a time from the reference clock, and
    a delay input element configured:
        to receive an input indicating a delay request when the circuit between the telephone line and telephone is about to be obstructed; and
        to delay obstructing the circuit between the telephone line and telephone upon receiving the input.

2. The device of claim 1, further comprising a memory configured to store the time reference, the memory being operatively coupled to the processor.

3. The device of claim 2, wherein the time reference is an amount of time that a call may proceed and wherein the processor causes the switch to move from the first position to the second position when the amount of time that the call may proceed has expired.

4. The device of claim 3, wherein the processor is further coupled to the telephone line, is further configured to interpret number tones transmitted through the telephone line, and is further configured to control the position of the switch based on whether a dialed number begins with a 1 thereby indicating a long distance call such that the processor moves the switch from the first position to the second position only when the call is long distance and when the amount of time that the call may proceed has expired.

5. The device of claim 3, wherein the memory also stores telephone numbers, and wherein the processor is further coupled to the telephone line, is further configured to interpret number tones transmitted through the telephone line, and is further configured to control the position of the switch based on whether a dialed number is a telephone number stored in memory such that the processor moves the switch from the first position to the second position only when the call is to a number stored in memory and when the amount of time that the call may proceed has expired.

6. The device of claim 5, wherein the memory stores an individual time reference for each stored telephone number and wherein the processor refers to the individual time reference for the dialed number when determining when to move the position of the switch.

7. The device of claim 2, wherein the time reference is an interval of time when a call may not proceed and wherein the processor causes the switch to move to the second position during the interval in response to a dialed number.

8. The device of claim 7, wherein the processor is further coupled to the telephone line, is further configured to interpret number tones transmitted through the telephone line, and is further configured to control the position of the switch based on whether a dialed number begins with a 1 thereby indicating a long distance call such that the processor causes the switch to move to the second position only when the dialed number is long distance during the interval.

9. The device of claim 7, wherein the memory also stores telephone numbers, and wherein the processor is further coupled to the telephone line, is further configured to interpret number tones transmitted through the telephone line, and is further configured to control the position of the switch based on whether a dialed number is a telephone number stored in memory such that the processor causes the switch to move to the second position only when the dialed number is a number stored in memory during the interval.

10. The device of claim 7, wherein the processor is further coupled to the telephone line, is further configured to interpret number tones transmitted through the telephone line, and is further configured to cause the switch to remain in the first position during the interval when the dialed number is 911 but move to the second position during the interval for any other dialed number.

11. The device of claim 2, further comprising a keypad and wherein the processor is configured to receive the time reference through the keypad and store the time reference in the memory.

12. The device of claim 3, further comprising an annunciator operatively coupled to the processor and wherein the processor is further configured to activate the annunciator to provide a warning that the call will be ended based upon the occurrence of a time reference for warning that occurs earlier in time than the time reference for moving the switch to the second position.

13. The device of claim 12, wherein the annunciator is an audio circuit.

14. The device of claim 13, wherein the delay input element comprises a button operatively coupled to the processor and wherein the processor delays moving the switch to the second position after the occurrence of the time reference when the button is depressed after the annunciator has activated.

15. A method of controlling telephone usage, comprising:
    determining a time;
    comparing the time to a time reference;
    completing a circuit between a telephone line and a telephone to allow a phone call to proceed when the time is different than the time reference;
    signaling the impending obstructing of the circuit between the telephone line and the telephone when the time is almost equal to the time reference;
    receiving an input from a delay input device indicating a desire to delay obstructing the circuit; and
    delaying the obstructing of the circuit.

16. The method of claim 15, wherein the time reference is an amount of time that a call may proceed.

17. The method of claim 16, further comprising:
comparing a dialed number to a stored telephone number; and
obstructing the circuit only when the dialed number is the stored telephone number and when the time is equal to the time reference.

18. The method of claim 16, further comprising:
detecting whether a dialed number begins with a 1; and
obstructing the circuit only when the dialed number begins with a 1 and when the time is equal to the time reference.

19. The method of claim 15, wherein the time reference is an interval of time when a call may not proceed.

20. The method of claim 19, further comprising:
comparing a dialed number to a stored telephone number; and
obstructing the circuit only when the dialed number is the stored telephone number and when the time is within the time reference.

21. The method of claim 19, further comprising:
detecting whether a dialed number begins with a 1; and
obstructing the circuit only when the dialed number begins with a 1 and when the time is within the time reference.

22. A method of controlling telephone usage, comprising:
determining a time;
comparing the time to a time reference, wherein the time reference is an amount of time that a call may proceed;
completing a circuit between a telephone line and a telephone to allow a phone call to proceed when the time is different than the time reference;
signaling the impending obstructing of the circuit between the telephone line and the telephone when the time is almost equal to the time reference;
receiving an input from a delay input device indicating a desire to delay obstructing the circuit;
delaying the obstructing of the circuit.
comparing a dialed number to a stored telephone number;
obstructing the circuit when the dialed number is the stored telephone number and when the time is equal to the time reference;
detecting whether a dialed number begins with a 1; and
obstructing the circuit when the dialed number begins with a 1 and when the time is equal to the time reference.

23. The method of claim 22, further comprising:
comparing the dialed number to an emergency telephone number;
preventing obstructing of the circuit when the dialed number is the emergency telephone number.

* * * * *